Dec. 27, 1938.  J. G. TINGLE  2,141,568
MOTOR PROPELLED VEHICLE
Filed Feb. 14, 1938
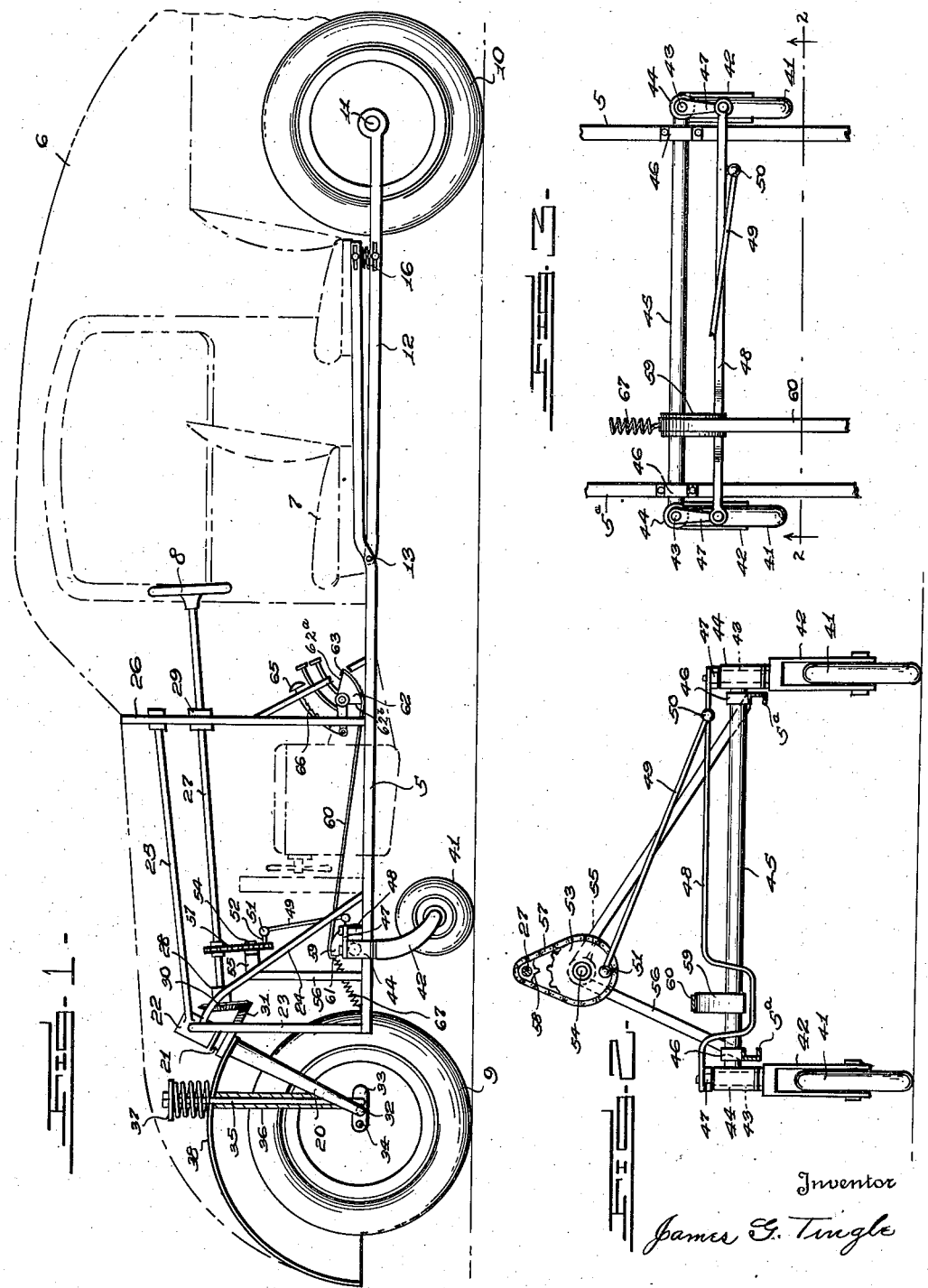
Inventor
James G. Tingle
By Shepherd Campbell
Attorneys Patented Dec. 27, 1938

2,141,568

UNITED STATES PATENT OFFICE 2,141,568

MOTOR PROPELLED VEHICLE

James G. Tingle, Miami, Fla.

Application February 14, 1938, Serial No. 190,503

5 Claims. (Cl. 280—293)

This invention relates to motor-propelled vehicles of the type employing two ground wheels disposed in tandem, one of said wheels being pivoted for turning to effect the steering of the vehicle.

A machine of this general character is described in my co-pending application Serial No. 98,947, filed September 1, 1936, of which this present application is a continuation in part.

In common with the machine of my aforesaid application, the device of the present invention comprises a pair of supporting prop wheels arranged to be elevated from the ground or forced into engagement with the ground. When in the latter position, these prop wheels serve to maintain the vehicle in an upright position when it is at rest, as for example when forced to come to a stop in traffic.

The improvement embodied in the present application over what is disclosed in my aforesaid application consists in the provision of means for steering the prop wheels in unison with the main steering ground wheel of the vehicle and under the influence of the main steering hand wheel of the vehicle. By virtue of thus providing for the steering of the prop wheels, the vehicle may move in a reverse direction with the same facility as in a forward direction, and without having the ground wheels twist around sidewise.

This is an important consideration, because it enables the vehicle to be turned in close spaces. A vehicle of this character is, by its very nature, quite long in proportion to its width, and this is especially true where, as is sometimes the case, seats are arranged in tandem for more than one person.

Where the available room for turning is such that the vehicle may swing around by a continuous forward movement, the steering of the prop wheels is not a matter of importance, but where the length of the vehicle is such that continuous forward movement cannot be had, but the vehicle must be backed in making the turn, the steering of the prop wheels in unison with the main steering ground wheel is a feature of great utility and convenience and avoids the possibility that the driver will have to dismount and lift the front of the vehicle around.

In the accompanying drawing, wherein like numerals designate corresponding parts throughout the several figures of the drawing:

Figure 1 is a diagrammatic side elevation of a vehicle constructed in accordance with the invention;

Fig. 2 is a vertical sectional view on line 2—2 of Fig. 1, with portions of the framework omitted, and Fig. 3 is a plan view of the prop wheels and the actuating connections and supports for the same.

The vehicle of the present invention comprises a main frame 5 to which is secured the body or shell of the vehicle 6. This body is of streamline form and is relatively long and narrow. The frame carries an operator's seat 7, from which a steering wheel 8 is accessible. When in operation, the frame is supported from the front wheel 9 and the rear wheel 10, the rear wheel 10 being supported through the bearings, hereinafter described, from the spindle 11. This spindle is in turn carried by the rear end of a rear fork 12, said fork having pivotal engagement at 13 with the main frame 5.

Any suitable spring arrangement may be employed to exert a thrust between rear fork 12 and the main frame 5 to cushion the movement of the rear fork, this feature forming no part of the present invention, but such a spring being indicated at 16.

The frame 5 and body 6 are supported from the front fork 20. The shank 21 of this fork is mounted to turn in fixed head 22 in a manner common in bicycle and motorcycle construction. Rigid braces 23 and 24 welded to said head extend outwardly and downwardly and connect with the opposite side members of frame 5. A third brace 25, rigidly welded to the head 22, extends from said head and is rigidly fixed to a dash 26.

Steering shaft 27, by which the hand steering wheel 8 is carried, is mounted to turn in bearings 28 and 29 and carries at its forward end a segmental pinion 30. This segmental pinion meshes with a gear segment 31 that is rigidly fixed to the shank 21 so that movement of the steering wheel will impart direct turning movement to the front fork and consequently to the front wheel.

The lower ends of the front fork are pivotally connected at 32 to links 33, the forward ends of these links carrying the front axle 34 upon which the front wheel 9 is mounted to turn in a manner common in bicycle and motorcycle construction. The rear ends of the links are pivotally engaged with rods 35 which extend upwardly through guide housings 36, and at their upper ends are fixed to a transverse plate 37.

The upper ends of the guide housings are connected by a suitable tie plate 38 to the upper portion of the front fork 20 so that the front wheel, front fork, housings 36 and associated parts all move bodily together in the turning movement of the vehicle. The downward movement of plate 37 under the pull of rods 35 is resisted by a stout spring 39 which bears against said tie plate 38. The housings 36 are rigidly affixed to the members of the front fork and constitute rigid support for plate 38 and spring 39.

As described, the vehicle is held in an upright position when it is not in motion, by a pair of caster wheels 41. These wheels are mounted in the forks 42, and these forks are in turn carried by shanks 43. These shanks 43 are mounted to turn in the T-heads 44 of a transverse rock shaft 45 that is journaled in bearings 46 of the side members 5ª of the frame 5.

Crank arms 47, upon the upper ends of the shanks 43, are connected to move in unison by means of a cross-link 48. A drag link 49 is connected at its lower end by a ball and socket connection 50 to the cross-link 48 and is connected at its upper end by another ball and socket connection 51 to a crank extension 52 upon a sprocket wheel 53. This sprocket wheel is mounted upon a stub shaft 54, that is journaled in a bearing 55 of an A frame 56.

By referring to Fig. 2, it will be seen that this A frame comprises one long leg and one short leg, by virtue of which the bearing 55 is caused to lie toward that side of the vehicle remote from the ball and socket connection 50. Further, it will be observed that the bearing 55 is not parallel with the main frame 5 but lies in parallelism with the steering shaft 27.

The sprocket wheel 53 is connected by a sprocket chain 57 with a sprocket pinion 58 on steering shaft 27. It is clear that when shaft 27 is turned under the manipulation of hand wheel 8 to effect a turning movement of the front wheel 9 of the vehicle, a corresponding turning movement will be imparted to the prop wheels 41 through the resultant movement of links 49 and 48 and cranks 47 upon shanks 43.

The arrangement described not only provides for the necessary turning movement of the caster wheels but, through the ball and socket connections of drag link 47, it permits the caster wheels to be thrown upwardly and out of engagement with the ground during the time that the vehicle is in motion. This is accomplished by imparting a partial turning movement to rock shaft 45 through any suitable mechanism.

One arrangement which I have found highly efficient for this purpose comprises a cam 59 upon rock shaft 45. A preferably metallic strap or tape 60 is connected to the cam 59 at point 61 and is connected to a corresponding cam 62 at point 63. The cam 62 is secured at its heel 64 to a foot pedal 65.

When the pedal is thrust downwardly, cam 62 is rocked, and by reason of the fact that its side 62ª is considerably longer than its side 62ᵇ, acts to impart a quick initial downwardly swinging movement to the prop wheels to bring them quickly into engagement with the ground and to thereafter exert a slower but correspondingly more powerful action in bringing these prop wheels to their final supporting position.

In this latter action, the prop wheels are required to perform the work of bringing the vehicle to a level against the action of its tendency to tip with the weight of the passenger or passengers. Thus, it is important to have their quick initial movement of the prop wheels into engagement with the ground before the vehicle has time to tip over too far and to thereafter have the more powerful movement necessary to bring the vehicle to upright position.

The pedal 65 may be provided with any suitable retaining means, such as a ratchet 66, and when the pedal is released, a spring 67 may act to move the ground wheels out of engagement with the ground.

In the rocking movement of shaft 45 to elevate the prop wheels, it will be understood that these prop wheels, with their shanks, their crank arms, and connecting cross-link 48, all move together, so that the cross-link moves to a position where it partially overlies rock shaft 45. This movement is permitted by having the A frame of such configuration that the sprocket wheel 53 is brought well to one side of the center line of the vehicle while the ball and socket connection 50 is disposed well toward the other side of the vehicle.

Thus, the drag link 49 may be made of such length and lie at such an angle that, in conjunction with its ball and socket connections, the necessary rocking movement of rock shaft 45 may be had without interference by the drag link 49.

It is to be understood that the invention is not limited to the precise construction set forth, but that it includes within its purview whatever changes fairly come within either the terms or the spirit of the appended claims.

Having described my invention, what I claim is:

1. The combination with a vehicle comprising a main frame, front and rear ground wheels and means for effecting steering movement of the front ground wheel comprising a steering shaft, of a pair of caster prop wheels, forks in which said prop wheels are journaled, upstanding shanks carried by said forks, a rock shaft extending across said frame in which said shanks are journalled to turn, cranks upon said shanks, a cross-link connecting the cranks of the two prop wheels, a drag link connected to the cross-link, connections between the drag link and the steering shaft to effect steering movement of the prop wheels from said steering shaft and means for turning the rock shaft about its axis to throw the caster into and out of engagement with the ground.

2. The combination with a vehicle comprising a main frame, front and rear ground wheels and means for effecting steering movement of the front ground wheel comprising a steering shaft, of a pair of caster prop wheels, forks in which said prop wheels are journaled, upstanding shanks carried by said forks, a rock shaft extending across said frame in which said shanks are supported, cranks upon said shanks, a cross-link connecting the cranks of the two prop wheels, a sprocket wheel mounted upon a shaft set in parallelism with said steering shaft, sprocket connections between the sprocket wheel and the steering shaft, a crank carried by the sprocket wheel, and a drag link having a ball and socket connection with said crank at one of its ends, and a ball and socket connection with the cross-link at its other end, said ball and socket connections permitting the drag link to swing bodily with the cranks of the shanks while maintaining the connections between the sprocket wheel and drag link.

3. In a device of the character described, the combination with a vehicle of the tandem wheel type which tends to tip when at rest, of a prop construction for the same comprising a pair of caster wheels, forks in which said caster wheels are mounted to turn, a transverse rock shaft journalled upon the frame, means for mounting said forks in the rock shaft to turn about a vertical axis, means for imparting partial turning movement to the rock shaft to swing the prop wheels into and out of engagement with the ground, spring means tending to elevate the prop wheels, a hand steering wheel, a steering shaft by which said wheel is carried, and means for imparting turning movement in unison to the forks of the prop wheels from said steering shaft, the means for turning the rock shaft comprising a manually operable foot pedal, a cam moved by said pedal, a cam upon the rock shaft, each of said cams comprising an arcuate face, and a strap connected to said cams at the tips thereof, the distance from the pivot point of said cams to their heels being less than the distance from the pivot point of said cams to their points.

4. A steering and prop mechanism for a tandem two-wheel vehicle of the class comprising an elongated supporting frame and a driver's seat thereon so arranged that the feet of the driver lie above the level of the frame when the vehicle is in motion, comprising a manually operable steering wheel accessible from the driver's seat, a steering shaft by which said wheel is carried, said shaft lying at an obtuse angle to the supporting frame with its forward end lower than the steering wheel end, gearing between the forward end of said shaft and the front wheel of the vehicle, a stub shaft and a bearing for the same disposed in parallelism with the steering shaft but closer to one side of the frame than the other, sprocket connections between the steering shaft and the stub shaft, comprising a sprocket wheel upon the stub shaft, a crank carried by said sprocket wheel and projecting from a side face thereof, a link having a ball and socket connection with said crank, a transversely extending drag link with which the first named link has a ball and socket joint connection at a point adjacent that side of the frame that is farthest from the said sprocket connection, a transversely disposed rock shaft upon the frame having vertical bearing portions at its ends, caster wheels journalled to turn in said vertical bearing portions and cranks for turning said caster wheels and to which cranks the ends of the drag link are connected.

5. A structure as recited in claim 4, in combination with means controllable from the driver's seat for rocking the rock shaft to throw the prop wheels into engagement with the ground, the ball and socket connections of the link permitting the drag link to swing bodily with the cranks to which it is attached while maintaining the connection between the drag link and the sprocket wheel.

JAMES G. TINGLE.